(No Model.)

J. L. HENDERSON.
CORN PLANTER.

No. 380,571. Patented Apr. 3, 1888.

Witnesses.
L. L. Gardner
Edm. P. Ellis

Inventor.
J. L. Henderson,
per J. A. Lehmann,
atty.

UNITED STATES PATENT OFFICE.

JAMES L. HENDERSON, OF BLOOMINGTON, INDIANA.

CORN-PLANTER.

SPECIFICATION forming part of Letters Patent No. 380,571, dated April 3, 1888.

Application filed January 23, 1888. Serial No. 261,558. (No model.)

*To all whom it may concern:*

Be it known that I, JAMES L. HENDERSON, of Bloomington, in the county of Monroe and State of Indiana, have invented certain new and useful Improvements in Corn-Planters; and I do hereby declare the following to be a full, clear, and exact description of the invention, such as will enable others skilled in the art to which it pertains to make and use it, reference being had to the accompanying drawings, which form part of this specification.

My invention relates to an improvement in corn-planters; and it consists in the combination of the driving-wheels placed upon short axles of their own, the sprocket-wheels connected to one of the wheels, a shaft which extends entirely across the frame and which is provided with a sprocket-wheel at one end and with two disks provided with cams on their inner sides, a rod which is moved back and forth alternately by the cam-disks, and brace-rods secured at their rear ends to the endwise-moving rod and at their forward ends to the rod which operates the seed-slides, as will be more fully described hereinafter.

The object of my invention is to operate the seed-slide by a shaft which extends across the frame in advance of the short axles of the driving-wheels, instead of directly from the axle, as has heretofore been the case.

Figure 1:
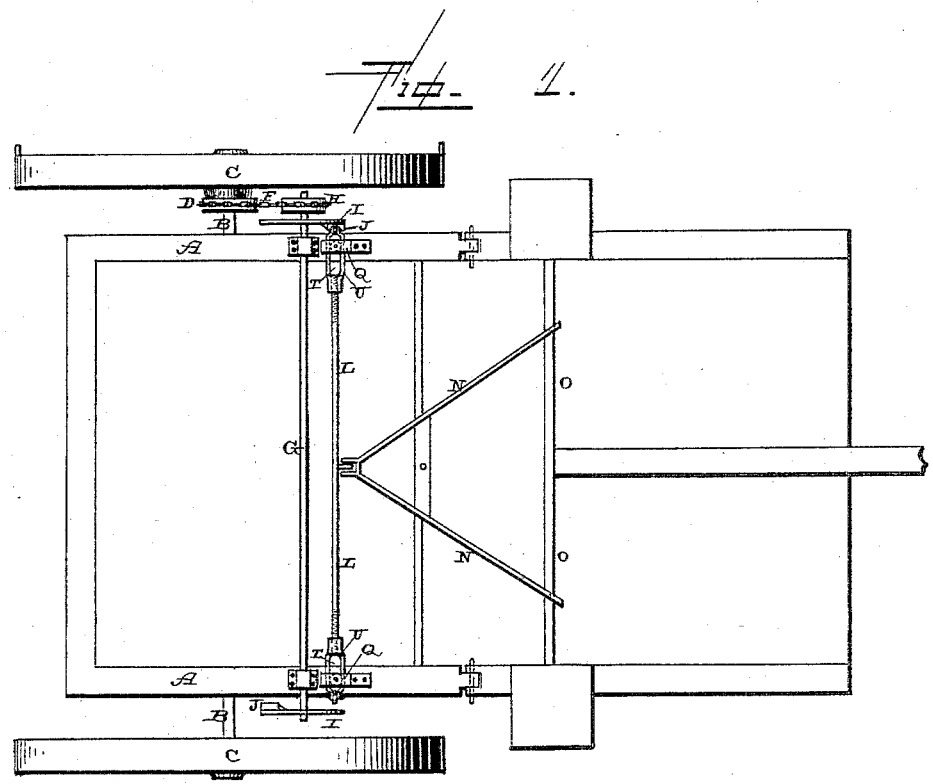
Figure 2:
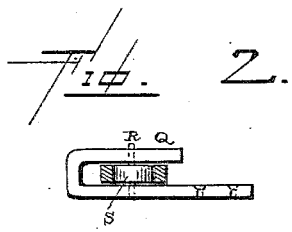

Figure 1 in the accompanying drawings is a plan view of a machine which embodies my invention. Fig. 2 is a detail.

A represents a suitable frame-work, which has the short axles B secured to opposite sides, and upon which axles the driving-wheels C are placed.

Secured to the hub of one of the wheels C is a sprocket-wheel, D, from which extends a sprocket-chain, F, which gives motion to the shaft G, provided with a sprocket-wheel, H, upon one end. This shaft G extends entirely across the frame in advance of the two short axles B and has the disks I secured rigidly to the opposite ends. To the inner side of each of these disks I is secured a suitable cam, J, for the purpose of alternately moving the rod L endwise. The cams are placed upon opposite edges of the disks I, so that they are alternately brought into operation for the purpose of forcing the rod L endwise. This rod L extends across the frame A parallel with the shaft G, and as it is struck by each one of the cams J it is forced endwise toward the opposite side of the frame.

Secured to the frame are two U-shaped strap-irons, Q, which have axles R journaled therein, and which axles are provided with guiding-rollers S. The rod is provided with a slot, T, at each end, and through these slots the rollers pass for the purpose of guiding the rod back and forth in its movements and holding it in position. The castings U upon the ends of the rod are connected thereto by right and left screws, so that they can be adjusted, and thus regulate the distance the rod shall be moved. Connected loosely to this endwise-moving rod L are the brace-rods N, which may either be made in separate parts or of one continuous rod, and which have their forward ends rigidly secured to the sliding rod O, as shown. As the rod L is forced back and forth upon the frame, the brace-rod N forces the slide-rod back and forth for the purpose of operating the seed-slides in the corn-boxes.

The parts here shown and described can be placed as an attachment upon any corn-planter, and is much better than using a permanent axle, as it makes the wheels run independently of each other. The parts are few, simple, easily operated, and are not liable to get out of order.

Secured to each of the wheels C are suitable corn-markers, so as to mark the ground where the corn is dropped.

Having thus described my invention, I claim—

1. The combination of the frame A, the axles B, and driving-wheels C, with the sprocket-wheels D H, driving-chain F, shaft G, provided with the cam-disks I J, endwise-moving rod L, braces N, and the slide-rod O, substantially as shown and described.

2. The combination of the rod L, provided with a slotted adjustable casting at each end, with a U-shaped strap-iron having rollers journaled thereon, and which rollers pass through the slots in the castings, substantially as set forth.

In testimony whereof I affix my signature in presence of two witnesses.

JAMES L. HENDERSON.

Witnesses:
WM. H. EAST,
R. MARSHALL.